April 3, 1934.  E. R. EVANS  1,953,217
BRAKE DRUM CONSTRUCTION
Filed May 13, 1929
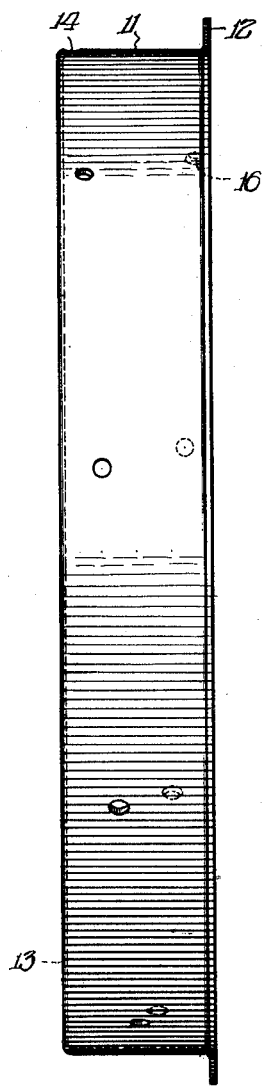
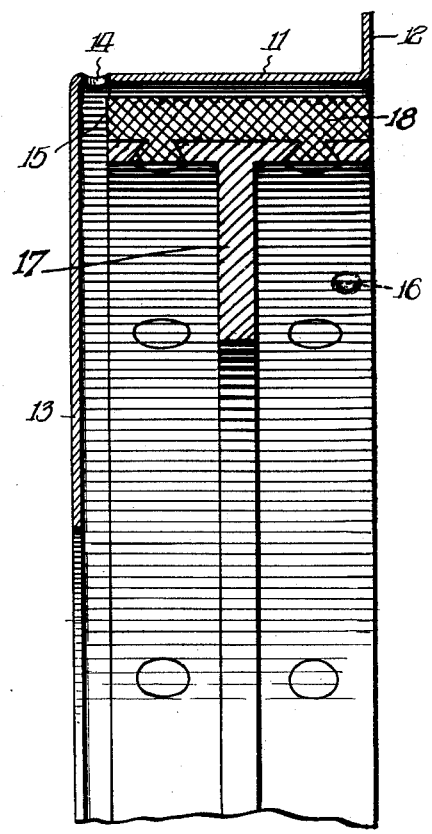
Inventor:
Edwin R. Evans,
By Wilkinson...
Attys.

Patented Apr. 3, 1934

1,953,217

UNITED STATES PATENT OFFICE 1,953,217

BRAKE DRUM CONSTRUCTION

Edwin R. Evans, Chicago, Ill.

Application May 13, 1929, Serial No. 362,490

4 Claims. (Cl. 188—218)

This invention relates to a new and improved brake drum construction and more particularly to a construction in which foreign matter will be automatically eliminated through the drum.

Usual types of brake drums, particularly those adapted for use on motor vehicles, are formed of pressed steel and have their surfaces machined to eliminate surface defects and to give a smooth surface for the application of the brake bands or shoes. The removal of the surface of the pressed steel also serves to remove the hardened surface portion which is hardened by the rolling and pressing of the steel. This exposes the somewhat softer interior of the sheet metal to the braking action. When steel is cast the material is not entirely homogeneous and the solid casting contains embedded particles of harder, high carbon steel or iron. In the rolling, these hard particles are normally covered by the steel and are not exposed on the surface or, if exposed, are so thoroughly bonded as not to work loose. When a rolled surface is machined more of these particles are exposed and their bond is often so weakened that they may work loose and serve to score the drum when carried between a hard brake lining and the drum.

The tendency in brake design is toward the use of larger braking surfaces and braking materials having lower friction coefficients, such as molded brake linings. These brake linings, since they are hard, tend to force any foreign matter which may work in between the shoes and drum against the softer metal of the drum. When this foreign matter is sand or grit, or small particles of steel or iron, there may be considerable scoring of the braking surfaces.

It is an object of the present invention to provide a drum construction associated with brake means having a hard brake lining, in which drum means are provided for the automatic elimination of foreign matter from between the drum and brake.

It is an additional object to provide such means without material reduction in the braking surface of the drum.

It is also an object to provide a construction of this character which is simple in design and adapted for commercial production.

Other and further objects will appear as the description proceeds.

I have shown a preferred embodiment of my invention in the accompanying drawing, in which—

Figure 1 is a side view of the brake drum; and Figure 2 is a fragmentary section taken on a larger scale.

The brake drum comprises the cylindrical braking portion 11 upon one side of which is an outwardly turned flange 12. Upon the other side is the inturned wide flange 13 which is secured by any suitable means to the wheel or rotating part to be braked. The braking portion 11 is provided with a spiral series of perforations beginning with perforation 14 and ending with perforation 16, which perforations have their edges slightly rounded at 15.

In Figure 2 has also been shown the metallic braking means or brake shoe 17 and the hard molded brake material 18 adapted to be brought in contact with the braking surface of the drum 11.

The series of perforations are so proportioned and spaced that the first perforation 14 is located adjacent one edge of the braking surface and the last perforation 16 is located adjacent the opposite edge of the braking surface. The holes are so proportioned that each hole or perforation overlaps the adjacent perforations in an axial direction. For example, the perforations may be $\frac{3}{16}$ of an inch in diameter and may be placed $\frac{1}{8}$ of an inch on centers so that there is an overlap of $\frac{1}{16}$ of an inch. A single series of such perforations therefore will permit discharge of dirt or grit regardless of its axial location upon the brake band or brake shoe. This removal will be accomplished in a single revolution of the wheel or rotating part since the spiral series completely covers the axial extent of the braking surface in a continuous series, extending about the circumference. It will be understood that the edges of the perforations are slightly rounded so as to prevent any burrs or sharp edges from scoring the brake lining or braking material.

As has been stated, one of the reasons for machining the usual form of brake drum is the elimination of scale or other loose material or material only slightly attached to the surface. This has been done with solid drums since this material would be drawn loose in the braking action and would score the drum.

With my present construction it will be possible to use a brake drum the surface of which is not machined. Any scale or foreign material working loose under the braking action, as well as any sand or grit which may work between the parts, will be eliminated through the perforations and will thus not be retained in position to score the drum. The scoring also may be minimized due to the fact that the hard skin or outer layer of the pressed metal need not have been removed by machining.

While I have shown one preferred form of my invention, it is capable of change and modification to meet varying conditions, and I contemplate such modifications as come within the spirit and scope of the appended claims.

I claim:

1. In combination, a brake drum and means carrying a hard molded brake lining and adapted to bring said lining into braking engagement with the drum, the drum being provided with a plurality of openings extending through the drum, said openings being located in spiral series extending around the drum and so located as to cover the entire width of the braking surface.

2. In combination, a brake drum having a plurality of radial openings extending therethrough from the friction surface, said openings having their centers displaced transversely of the drum successively in the same direction from the centers of the adjacent openings whereby the openings include a relatively small area of the friction surface and brake elements supporting hard molded brake lining material for frictional engagement with said drum.

3. In combination, a brake drum having a plurality of radial openings extending therethrough from the friction surface, said openings having their centers displaced transversely and circumferentially of the drum successively in the same direction from the centers of the adjacent openings whereby the openings include a relatively small area of the friction surface and brake elements supporting hard molded brake lining material for frictional engagement with said drum whereby said openings have the function of permitting the escape of particles which might score the friction surface of the drum.

4. In combination, a pressed steel brake drum having an unmachined friction surface and a plurality of radial openings extending through the drum from the friction surface, each of said openings having its center displaced transversely and circumferentially of the drum from the centers of the remaining openings successively in the same direction whereby said openings include a relatively small area of the friction surface and brake elements supporting hard molded brake lining material for frictional engagement with said drum whereby said openings permit the escape of particles which might score the friction surface of said drum.

EDWIN R. EVANS.